United States Patent Office 3,343,503
Patented Sept. 26, 1967

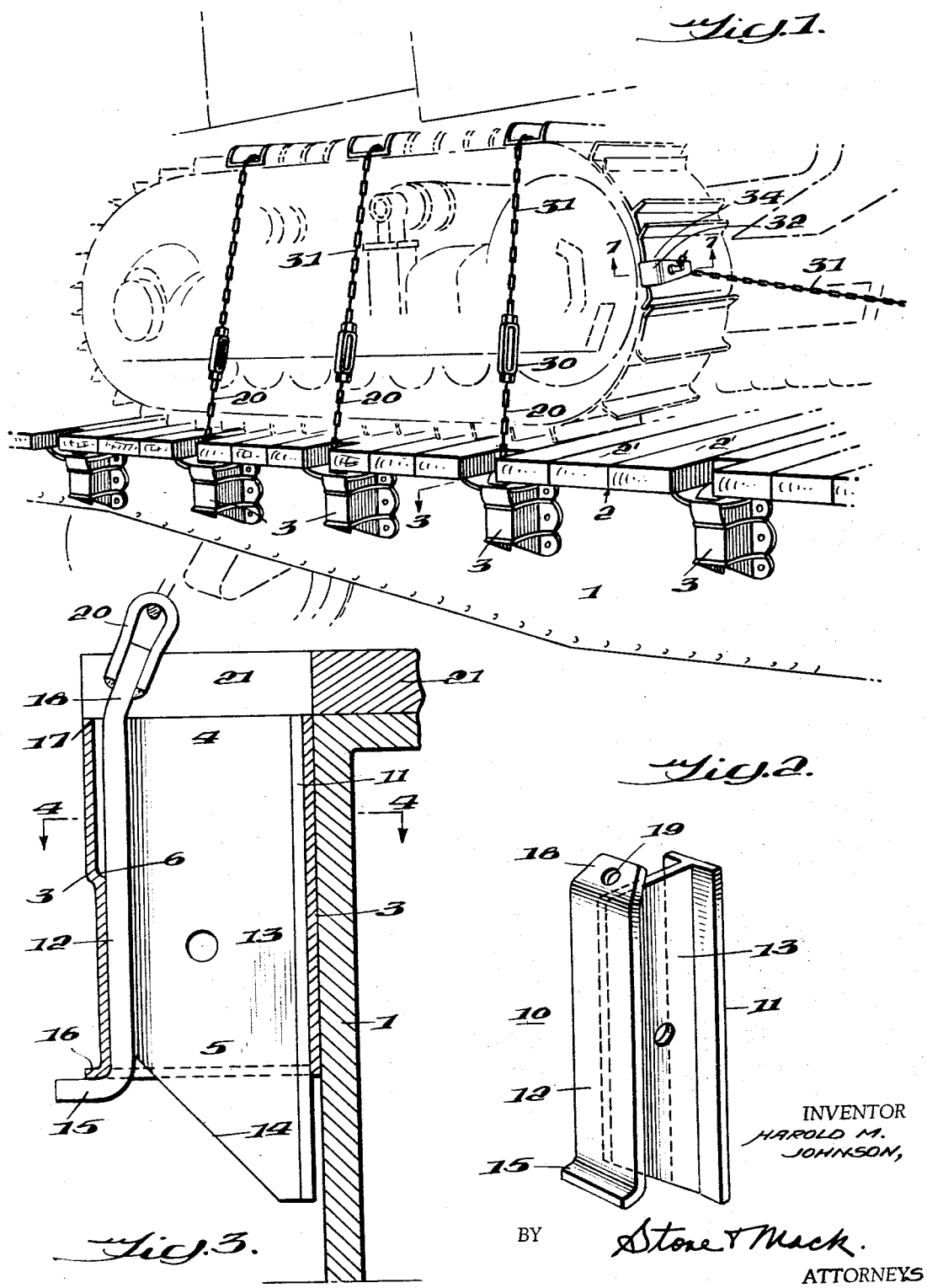

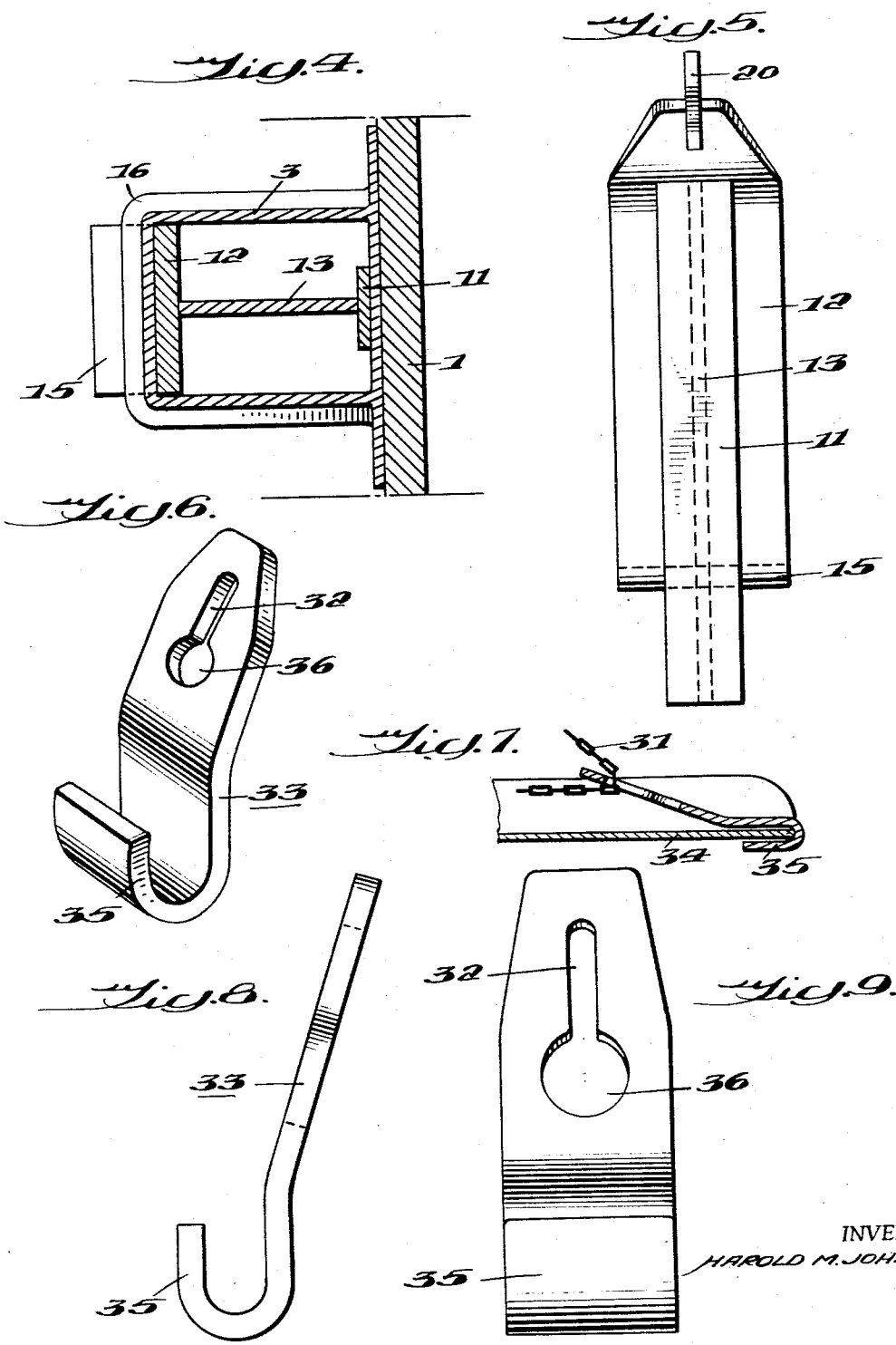

1

3,343,503
TIE-DOWN ANCHORING DEVICES FOR HEAVY EQUIPMENT ON RAILWAY FLAT-CARS
Harold M. Johnson, Peoria, Ill., assignor to Toledo, Peoria & Western Railroad Company, Peoria, Ill., a corporation of Delaware
Filed Mar. 9, 1965, Ser. No. 438,220
1 Claim. (Cl. 105—369)

This invention relates to a tie-down anchoring device for heavy equipment on railway flat-cars.

It is recognized that railroads are efficient and economical in transporting heavy loads at high speeds and at a high degree of safety and certainty in comparison with many other means of transportation. No railroad car, as yet, has been devised having suitably adjustable means for conveniently and expeditiously anchoring any type of road vehicle thereon with complete safety.

Briefly, then, the problem is to devise or modify a track vehicle which is capable of having the road vehicles quickly secured thereon and quickly releasable therefrom through adjustable fastening means whereby loading and unloading of the road vehicles is expeditiously accomplished.

The main object of this invention is to provide a track vehicle, preferably in the form of a flat-car, for suitably receiving one or more road vehicles thereon and which is equipped with suitable means for firmly securing the road vehicles to the bed thereof, the road vehicles being transported with their own wheels or treads resting upon said bed, yet without interfering with the use of the track vehicle as a flat-car.

Another object of this invention is to provide a fastening means which should not only comprise mechanism for holding the wheels or treads of a road vehicle against the bed of a car and to prevent fore and aft movement relative thereto, but should also have the capacity to laterally brace the road vehicle to prevent lateral movement thereof on the car bed.

Any fastening means that may be permanently located on the bed of the flat-car is apt to interfere with the loading and unloading of the road vehicles onto and off of the flat-car. The means disclosed herein is universally adapted to anchor any type of road vehicle to the car bed, regardless of the wheel base or tread thereof.

In order to acquaint those skilled in the art with the manner of constructing and operating a device of this invention, there will be described in connection with the accompanying drawings a specific embodiment of the invention.

In the drawings:

FIGURE 1 is a perspective view of a fragmentary portion of a flat-car illustrating the application of the new and novel fastening means as applied to the treads of a road vehicle, in this instance a tractor, mounted upon the car;

FIGURE 2 is a perspective view of the tie-down anchoring means or fastening means;

FIGURE 3 is a transverse vertical sectional view taken on the line 3—3 in FIGURE 1;

FIGURE 4 is a horizontal sectional view taken on the line 4—4 in FIGURE 3;

FIGURE 5 is a vertical view of the fastening means viewed from the rear of the device shown in FIGURE 2;

FIGURE 6 is a perspective view of a clamping device adapted to fit over the tractor tread of the crawler tractor shown in FIGURE 1;

FIGURE 7 is a sectional view of the clamping device taken on the line 7—7 in FIGURE 1;

FIGURE 8 is a vertical edge view of the clamping device; and

2

FIGURE 9 is a vertical front view of the clamping device shown in FIGURE 6.

The flat-car, in general, comprises track wheels embodied in a suitable truck of standard design, the wheels thereof being adapted to run upon the rails of a railroad. The flat-car is conventional and forms no part of the invention. The main body 1 of the car is suitably mounted upon the tracks through pivotal connections such as are well understood by those skilled in the art. The body 1 includes a bed or platform 2 which may be of any suitable construction but is preferably of wooden members 2' suitably secured to the body 1, said members lying transversely of the body, thereby forming a runway for the road vehicles to rest upon. The flat-car is provided with a series of conventional stake pockets 3, as shown in FIGURE 1. Each stake pocket is riveted to the body 1, as shown, and in reality is no more than a channel member, access to which is had by the openings 4 and 5; the bottom of the channel member facing outwardly and the flanges thereof being perpendicular to the body 1 and secured thereto, as shown. In the region where the wooden members 2' lie above the stake pockets, said members are cut out to permit insertion of a stake, which stake does not fall out of the bottom of the stake pocket because the pocket is formed with an inwardly projecting rib 6 whereby the stake is prevented from falling downwardly. Everything thus far is old in the art, since the description pertains to a conventional flat bed railway car owned and used by the Toledo, Peoria & Western Railroad Company.

Referring now more particularly to FIGURES 2, 3, 4 and 5 it is to be noted that the one-piece anchoring device shown in FIGURE 2 is designed to fit in the stake pocket and can only be inserted into the stake pocket through the bottom opening 5 thereof for reasons later to be disclosed.

The anchoring device 10 is fabricated from metal stock, the parts thereof being secured to each other preferably by welding. Basically it comprises an I beam section having a flange 11, another flange 12. As can be seen from the drawings flange 11 is of less width than flange 12 but it is longer than flange 12. The web portion 13 is welded to the flanges 11 and 12 and is shaped as shown in FIGURE 3, the bottom portion 14 being chamfered downwardly and inwardly from the flange 12 to the flange 11. Flange 12 is somewhat longer beyond the region where it is free of the chamfered portion 14, thus forming a lip 15 which is outwardly presented and shaped to abut against the lower edge portion 16 of the stake pocket 3. The upper edge portions of flange 11 and web 13 lie flush with each other and are designed to not extend above the upper edge portion 17 of the stake pocket 3. However, flange 12 has an integral portion 18 which constitutes a tab, said tab being formed by slightly bending flange 12 inwardly toward flange 11 commencing in the region where it is free of the web 11. The tab is provided with an opening 19 to accommodate a link chain 20.

Flanges 11 and 12 differ in their respective over-all lengths for the following reasons. Flange 11 is made longer than the stake pocket is deep so as to have ample bearing surface engagement with the car. Flange 12 is made so that it is free of the web 13 in its lower portion whereby to provide a portion 15 that may be bent outwardly to form a sturdy lip and thereby prevent the anchoring device 10 from being pulled upwardly out of the stake pocket when a pull is transmitted to the anchoring device by the chain 10. The web 13 is chamfered as shown to facilitate the formation of the lower regions of the flanges 11 and 12 as above set forth. Because of the lip 15, the anchoring device can be inserted into the stake pocket only from the bottom, and the over-all widths of the anchoring device occupy fully the interior dimensions of the stake pocket, thus making for a firm fit, particularly as to flange 12 and the lip 15.

Having described one such anchoring means it is to be understood that a plurality of such anchoring means are employed, when needed, and provided there are enough stake pockets on each car.

The preferred construction of fastening means comprises the tie-down member 10 joined to a turnbuckle 30 by means of the chain 20 as indicated in FIGURE 1. The turnbuckle is also attached to a chain 31 which in turn is adapted to fit into the key slot 32 of a clamp 33 (FIGURE 6). This clamp fits over the tractor tread 34 and engages the peripheral edge thereof as shown in FIGURE 1 by bringing the tongue 35 into gripping engagement therewith. The key slot 32 permits adjustment of the chain 31 by moving the chain into the eye 36, pulling it through to the desired length and then back into the slot for locking purposes. The locking occurs when the narrow portion of a chain link is slipped or dropped into the key slot so that the sides of the slot shall grip the end of the adjacent link of the chain. The turnbuckle is then used to obtain the desired tension on the chain.

In FIGURE 1, a chain 31 is shown as being locked in the clamp 33, said chain leading forwardly to an anchoring device (not shown) which device is in place in a stake pocket. The clamp 33 is shown on the outboard peripheral edge of the tractor tread. A similar chain 31 (not shown) leading forwardly to an anchoring device (not shown) is placed on the outboard peripheral edge of a tractor tread on the other side of the tractor crawler (not shown). Hence the chains 31 in leading to their respective anchoring devices are caused to cross and such an arrangement assists in preventing a to and fro movement of the road vehicle. Likewise, the same arrangement of clamps and chains is employed on the back end of the tractor crawler treads (not shown in FIGURE 1) to assist in preventing a to and fro movement of the road vehicle. This key slot arrangement in a clamp; the clamp and the crossed chains, taken together is old and well known in the art, but such an arrangement is not shown in the prior art in combination with the tie-down anchoring device shown herein. The side view showings of chains 31 and turnbuckles 30 in FIGURE 1 also include clamps 33 (not shown) which are secured to the inboard peripheral edges of spaced chains. The turnbuckles 30 are attached to chains 20 and 31 and since chains 20 are secured to the anchoring devices 10, the anchoring and tying-down of the road vehicle to the flat-car is accomplished when tension is placed upon the chains upon a turning of the turnbuckles. It is to be noted that the chains 20 which are secured to the tie-down anchoring devices drop through the floor of the flat-car by virtue of the spaces provided at intervals, said spaces being common to each stake pocket and created by not running the flooring over the stake pockets.

It is apparent that changes may be made in the specific structural elements in the preferred combination shown which will not depart from the field and scope of the present invention. Therefore it is not intended to be strictly limited to the specific description and illustrations of the device, but only insofar as the appended claim is so limited.

What is claimed is:

In combination, a conventional flatbed track vehicle, having a continuous unbroken surface thereon and provided with the usual conventional standard stake pockets so positioned on said track vehicle that they form no obstructions on said continuous surface, a road vehicle having its load supporting means resting upon said track vehicle, and a plurality of means for anchoring said load vehicle in fixed relation to said track vehicle, each means comprising a clamp attached to said load supporting means, independent means connecting each of said load supporting means directly with said track vehicle, said independent means each including a turnbuckle tensioning mechanism secured to one end of a link chain, the other end of said chain being secured to an anchoring device removably secured in a stake pocket, said anchoring device being provided with an outwardly directed lip in the lower region of a flange member which in width is as wide as the interior width of said stake pocket, said flange member being secured to a web member which in turn is secured to a second flange member in I-Beam cross-section said first and second flange members being spaced so that the first flange member is adapted to contact the stake pocket wall and the second flange member is adapted to contact the track vehicle, said first flange member being provided at its upper portion with an integral tab member to which said link chain is secured, whereby when said link chain is tensioned, said anchoring device will be anchored in said stake pocket when said lip abuts the lower marginal edge of said stake pocket.

References Cited
UNITED STATES PATENTS

| | | | |
|---|---|---|---|
| 750,659 | 1/1904 | Klingensmith et al. | 105—384 |
| 1,056,290 | 3/1913 | Murphy | 105—386 |
| 1,450,897 | 4/1923 | Stemmler | 280—179 |
| 1,805,872 | 5/1931 | Jordan et al. | 105—382 |
| 1,974,686 | 9/1934 | Meyerchord | 105—368 |
| 2,024,444 | 12/1935 | Friedlaender | 105—368 |
| 2,064,415 | 12/1936 | Colman | 105—368 |
| 2,128,667 | 8/1938 | Atherton | 105—368 |
| 3,091,193 | 5/1963 | Thomas | 105—386 |
| 3,193,122 | 7/1965 | Sauthoff | 105—380 |

ARTHUR L. LA POINT, *Primary Examiner.*

DRAYTON E. HOFFMAN, *Examiner.*